United States Patent
Hamedani et al.

(10) Patent No.: US 7,068,659 B1
(45) Date of Patent: Jun. 27, 2006

(54) METHOD AND APPARATUS FOR VIRTUAL PATH AGGREGATION (VPA) CONNECTION ADMISSION CONTROL (CAC)

(75) Inventors: Roxana Hamedani, Ottawa (CA); Jason T. Sterne, Ottawa (CA); Stanko Vuleta, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/293,293

(22) Filed: Apr. 16, 1999

(51) Int. Cl.
 *H04L 12/28* (2006.01)

(52) U.S. Cl. .................... 370/395.2; 370/230; 370/409; 370/468

(58) Field of Classification Search .............. 370/229, 370/230, 230.1, 231, 232, 233, 234, 235, 370/236, 351, 397, 400, 401, 409, 395.2, 370/395.21, 395.3, 395.41, 395.43
See application file for complete search history.

(56) References Cited

U.S. PATENT DOCUMENTS

| | | | | |
|---|---|---|---|---|
| 5,392,402 A | * | 2/1995 | Robrock, II | 709/227 |
| 5,467,348 A | * | 11/1995 | Medhat et al. | 370/395 |
| 5,583,857 A | * | 12/1996 | Soumiya | 370/233 |
| 5,982,748 A | * | 11/1999 | Yin et al. | 370/232 |
| 6,046,981 A | * | 4/2000 | Ramamurthy et al. | 370/232 |
| 6,097,722 A | * | 8/2000 | Graham et al. | 370/395 |
| 6,137,800 A | * | 10/2000 | Wiley et al. | 370/396 |
| 6,324,166 B1 | * | 11/2001 | Yokoyama et al. | 370/234 |

* cited by examiner

*Primary Examiner*—Ricky Ngo
*Assistant Examiner*—Duc Duong

(57) ABSTRACT

A method and apparatus for supporting virtual path aggregations (VPAs) in a communications network is presented. To establish a VPA in the network, a request for the VPA is received, where the request indicates a desired data path between a source switch and a destination switch. Based on the request, it is determined whether or not there are resources available to create the VPA. If the resources are present, the VPA is created. Once created, connections may be established using the VPA by first determining whether or not the needs of the connection are satisfied by the capabilities of the VPA. If the VPA is capable of supporting the connection, the connection is established using the VPA. If the VPA is not capable of supporting the connection, the connection may either be established using other resources or rejected.

34 Claims, 3 Drawing Sheets

METHOD AND APPARATUS FOR VIRTUAL PATH AGGREGATION (VPA) CONNECTION ADMISSION CONTROL (CAC)

FIELD OF THE INVENTION

The invention relates generally to communication systems and more particularly to connection admission control in a network that supports virtual path aggregations.

BACKGROUND OF THE INVENTION

Communications networks are evolving rapidly, and network designers are constantly challenged to improve the efficiency, speed, and overall performance of their networks. In such an environment, asynchronous transfer mode (ATM) is emerging as the broadband data communications technology of choice. ATM networks support a variety of different service categories providing a variety of qualities of service (QoS). This variety of service options allows ATM to satisfy the needs of many different types of network clients.

In order to support the variety of service categories, ATM traffic management enforces policing and shaping schemes that control the traffic flow throughout the network. Traffic that violates the policing and shaping requirements of the network can either be rejected or it can be tuned or shaped so that it conforms. These capabilities help ATM to improve the overall performance of the network and to take full advantage of the available resources.

Traffic in an ATM network is typically carried along virtual channel connections (VCCs). A VCC on a particular link is uniquely identified by the combination of a virtual path identifier (VPI) and a virtual channel identifier (VCI). Traffic from a number of different sources may have a common destination, and as such, may be combined to produce a virtual path connection (VPC) that includes a number of individual VCCs. The VPC is uniquely identified by a VPI, which is contained within a field of the ATM cell header. Each VCC within the VPC is uniquely identified by a corresponding VCI value. When the VPC reaches its destination, the VCCs within the VPC can be segmented by using the unique VCI values corresponding to each VCC.

ATM connections are established using the physical resources available in a network. The physical resources of the network can be divided into virtual segments, referred to as trunk groups (TGs). Trunk groups can be partitioned to support a number of different service categories. New connections are admitted in ATM networks by a connection admission control (CAC) algorithm. In order to establish a new connection, the physical and virtual resources available for the connection must be accurately understood by the connection admission control (CAC) algorithm.

Modifications to the current structure of VPCs and their role in ATM networks may provide additional advantages in terms of maximizing network efficiency. However, if the CAC algorithms do not possess the full range of parameters describing these modified VPCs, optimal allocation of resources within the network will not occur.

Therefore, a need exists for a method and apparatus for supporting modified VPCs in an ATM network.

DESCRIPTION OF A PREFERRED EMBODIMENT OF THE INVENTION

Figure 1:
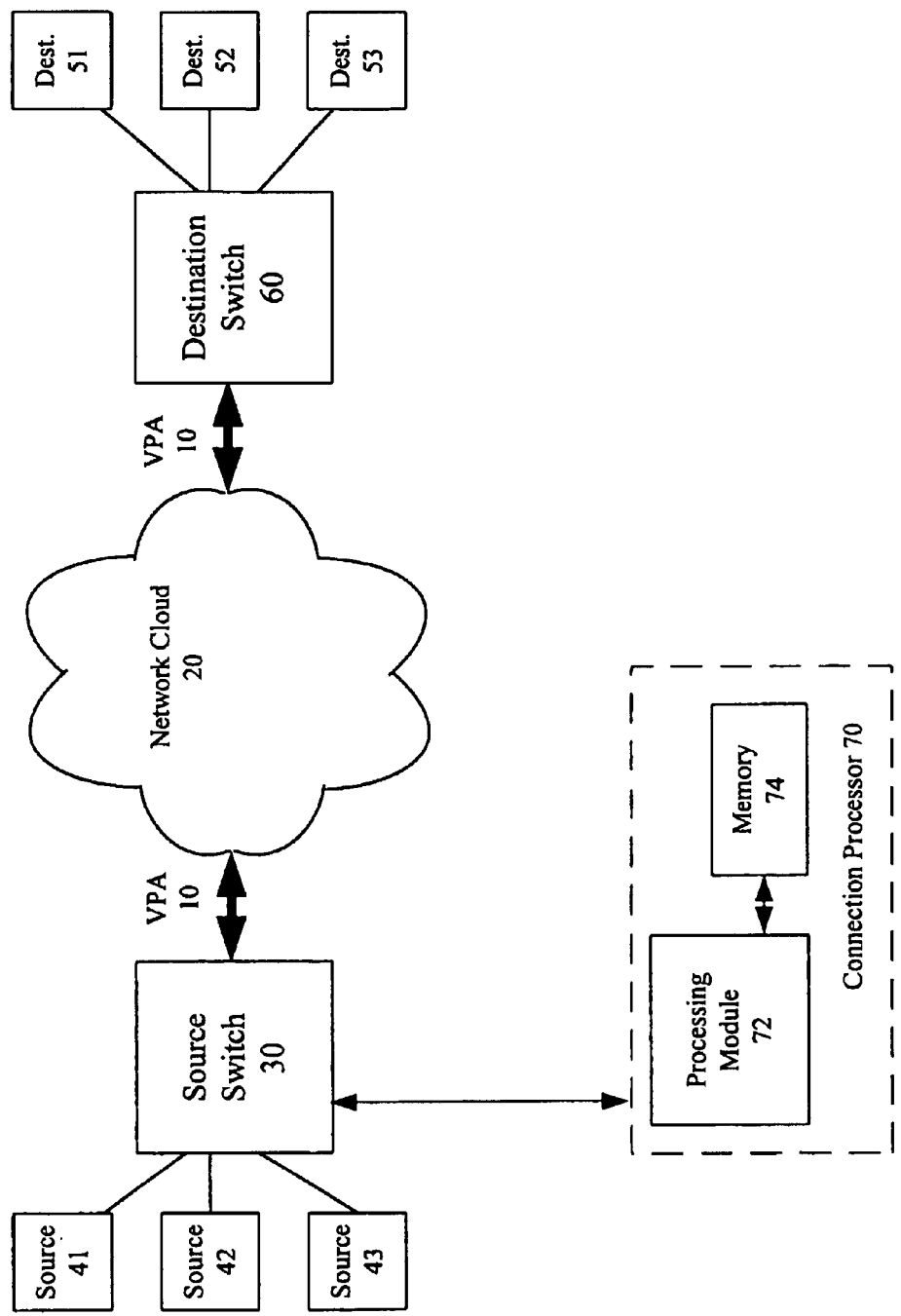
FIG. 1 illustrates a block diagram of a communications network in accordance with the present invention.

Generally, the present invention provides a method and apparatus for supporting virtual path aggregations (VPAs) in a communications network. To establish a VPA in the network, a request for the VPA is received, where the request indicates a desired data path between a source switch and a destination switch. The request also includes a traffic descriptor and a virtual path identifier (VPI) for the VPA at the source switch. Based on the request, it is determined whether or not there is a trunk group on a corresponding physical resource within the source switch that has a VPI that matches the VPI of the VPA.

When a trunk group having a matching VPI exists, the bandwidth characteristics of the VPA are compared with the bandwidth limitations within the trunk group. When the bandwidth characteristics of the VPA exceed the limitations of the trunk group, the VPA request is rejected. When the bandwidth characteristics of the VPA are within the limitations of the trunk group, the VPA is created within the trunk group.

When a trunk group having a matching VPI does not exist, the bandwidth characteristics of the VPA are compared with the bandwidth limitations of the corresponding physical resource. When the bandwidth characteristics of the VPA exceed the limitations of the corresponding physical resource, the VPA request is rejected. When the bandwidth characteristics of the VPA are within the limitations of the corresponding physical resource, the VPA is created within the physical resource.

Once a VPA has been created within the network, it may be utilized to establish connections. Establishing a connection over a VPA begins by receiving a request for a connection where the request includes a service category and a bandwidth requirement for the connection. If the service category of the connection is not supported by a trunk group that includes the VPA, the request is rejected. If the service category is supported by the trunk group, it is then determined whether or not the service category is supported by the VPA within the trunk group. If the service category is supported by the VPA, it is determined whether or not the bandwidth requirements for the connection are within the available bandwidth of the VPA and within the available bandwidth of the trunk group partition. The trunk group partition corresponds to the amount of bandwidth allocated to a particular service category within the trunk group. If the bandwidth requirements are available, the connection is established within the VPA. If the bandwidth requirements for the connection exceed the VPA's available bandwidth or the available bandwidth of the trunk group partition, the connection is rejected.

Providing the support necessary in the Connection Admission Control (CAC) algorithm for VPAs allows network systems to take full advantage of the beneficial characteristics of VPAs. In order to do so, the creation and utilization of VPAs must be included within the CAC algorithms. The method and apparatus described herein allow for such support within communications networks, including ATM networks.

Figure 2:
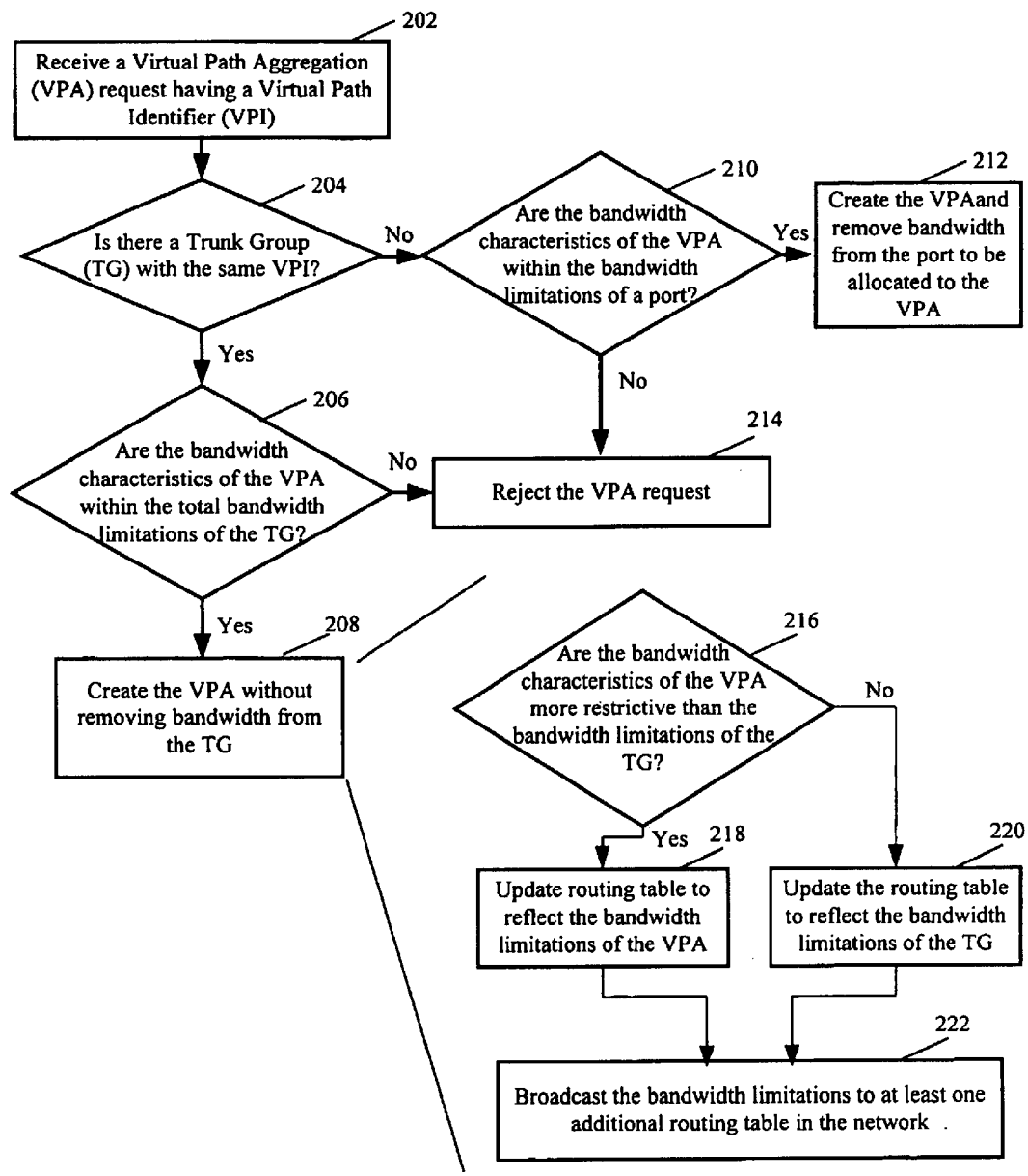
FIG. 2 illustrates a flow diagram of a method for establishing a virtual path aggregation within a communications network in accordance with the present invention.
Figure 3:
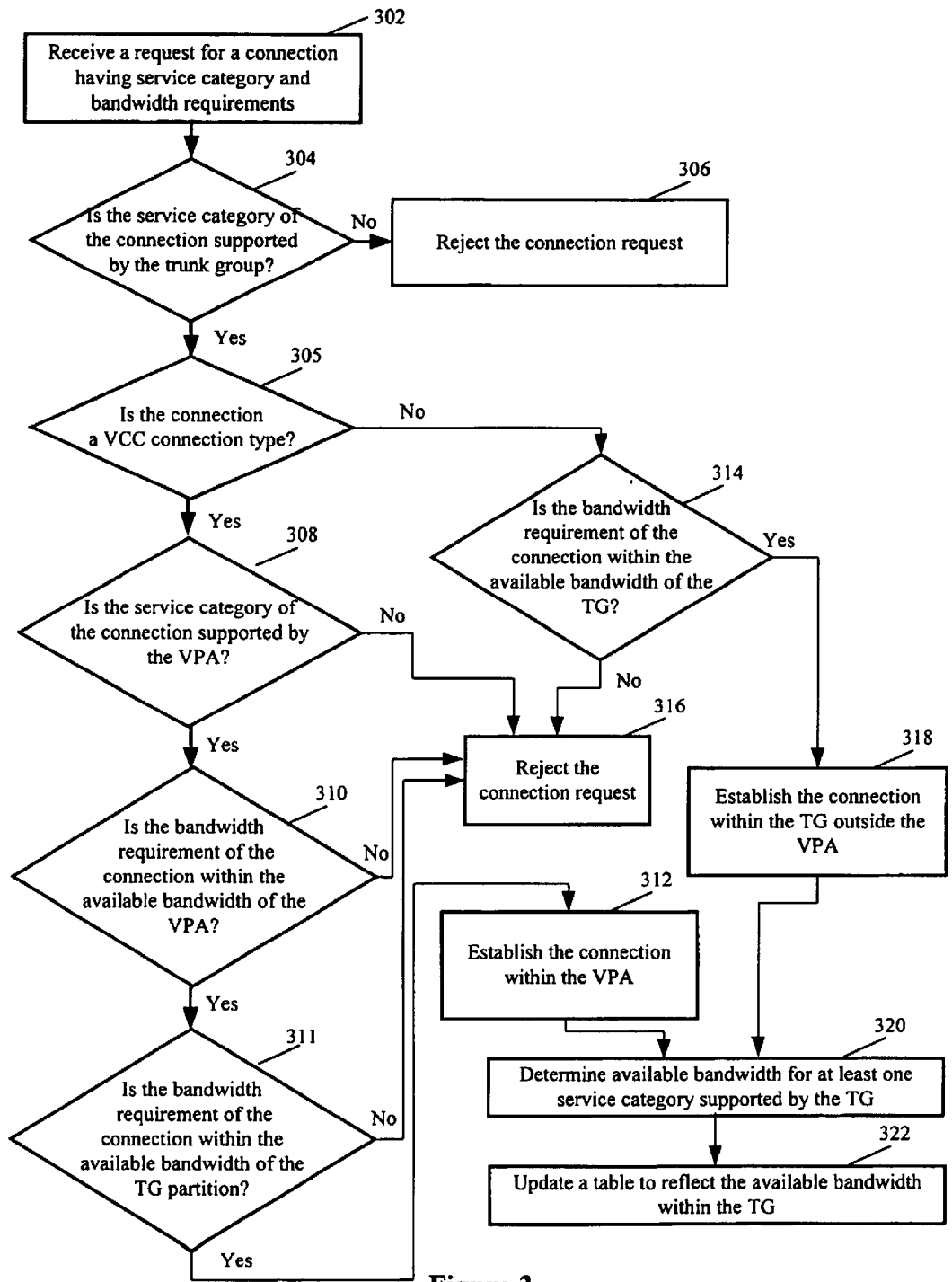
FIG. 3 illustrates a flow diagram of a method for establishing a connection using a virtual path aggregation in accordance with the present invention.

The invention can be better understood with reference to FIGS. 1–3. FIG. 1 illustrates a communications network, which is preferably an ATM communications network. The communications network supports virtual path aggregations (VPAs), which are virtual path connections (VPCs) which are capable of conveying VCC traffic without the need to set up and shape each VCC individually. VPAs allow for the ability to transport multiple VCCs with different traffic requirements over a single VPC, and shape the contained VCCs to the traffic parameters of the VPC.

Virtual path aggregations are described in further detail in co-pending patent applications, now issued as U.S. patents 6,163,542 and 6,643,293, which were filed on Sep. 5, 1997 and Nov. 27, 1998, respectively, and issued on Dec. 19, 2000, and Nov. 4, 2003, respectively.

FIG. 1 illustrates a communications network. The network cloud 20 is preferably an ATM network cloud and includes a number of switches. The switches allow for the establishment of connections between a source switch 30 and a destination switch 60. Included in these connections is the VPA connection 10. The VPA connection 10 includes a specific set of characteristics that describes its configuration. The source switch 30 is coupled to a plurality of sources 41–43, where the plurality of sources can establish connections with a plurality of destinations 51–53 utilizing the network 20 between the source switch 30 and the destination switch 60. The sources 41–43 may include entities such as telephone companies, universities, Internet Service Providers (ISPs), etc . . . .

The source switch 30 is preferably coupled to, or includes, a connection processor 70. The connection processor 70 includes a processing module 72 and a memory 74. The processing module 72 may include a single processing entity or plurality of processing entities. Such a processing entity may be a microprocessor, microcontroller, digital signal processor, state machine, logic circuitry, and/or any device that processes information based on operational and/or programming instructions. The memory 74 may be a single memory device or a plurality of memory devices. Such a memory device may be a read-only memory, random access memory device, floppy disk, hard drive memory, and/or any device that stores digital information. Note that when the processing module 72 has one or more of its functions performed by a state machine and/or logic circuitry, the memory containing the corresponding operational instructions is embedded within the state machine and/or logic circuitry.

The memory 74 stores programming and/or operational instructions, preferably corresponding to a CAC algorithm, that allow the processing module 72 to perform the methods illustrated in FIGS. 2 and 3. FIG. 2 illustrates a method for setting up a virtual path aggregation (VPA). The process begins at step 202, where a VPA request is received. The VPA request includes a virtual path identifier (VPI) corresponding to the VPA to be established based on the request. The request also includes a desired data path, where the desired data path indicates a source switch and a destination switch. The request also indicates a traffic descriptor for the VPA to be created.

The service categories supported in an ATM system include constant bit rate (CBR), real-time variable bit rate (rt-VBR), non-real-time variable bit rate (nrt-VBR), available bit rate (ABR), and unspecified bit rate (UBR). These various service categories have different properties that make them appropriate for different users in the network.

As stated earlier, trunk groups (TGs) are used to provide virtual allocations of physical resources within a node, or switch. The trunk groups divide up the physical resources into virtual segments. Trunk groups may partition available bandwidth between the different service categories, wherein each partition within the trunk group has a corresponding amount of available bandwidth. At step 204, it is determined whether or not there is a trunk group on the source node that has a VPI matching that of the requested VPA. If it is determined that there is not a trunk group having a matching VPI, the method proceeds to step 210. At step 210, the bandwidth characteristics of the VPA are compared with the bandwidth limitations of a port, where a favorable comparison preferably indicates that the bandwidth characteristics of the VPA fit within the bandwidth limitations of the port. Thus, if some of the physical resources of the port have been allocated to trunk groups, but there are remaining resources within the port, step 210 determines whether or not the VPA can be created within these remaining resources.

At step 212, if it is determined that the VPA will fit within the bandwidth limitations of the port, the VPA is created such that it corresponds to the port. This creation reduces the available bandwidth of the port by removing bandwidth from the port to be allocated to the VPA. The VPA in this case does not correspond to a trunk group that has already had bandwidth of the port allocated to it (reducing available resources of the port), and thus port resources must be allocated to the VPA. If it is determined at step 210 that the bandwidth characteristics of the VPA are not within the limitations of the port within the source node, the method proceeds to step 214 where the VPA request is rejected.

If it is determined at step 204 that there is a trunk group within the source node that has a VPI that matches that of the VPA request, the method proceeds to step 206 where the bandwidth characteristics of the VPA are compared with the total bandwidth limitations of the trunk group. The total bandwidth limitations include all of the available bandwidth in the trunk group, rather than available bandwidth on a partition level. The bandwidth for a particular trunk group partition can be "overbooked" and as such the limitations of the VPA may be more restrictive than the trunk group. The table that indicates the available bandwidth of the VPA will indicate the more restrictive limitation between the limitations of the trunk group and the VPA. The determination of the value to store in the table is accomplished in steps 216–222, which are discussed below. Preferably, a favorable comparison indicates that the bandwidth characteristics of the VPA are within the bandwidth limitations of the trunk group. If the bandwidth requirements of the VPA exceed the limitations of the trunk group, the VPA request is rejected at step 214.

If it is determined at step 206 that the bandwidth characteristics of the VPA are within the total limitations of the trunk group, the method proceeds to step 208. At step 208, the VPA is created such that it corresponds to the trunk group; however, bandwidth characteristics of the trunk group are not reduced.

The creation of the VPA within the trunk group is preferably accomplished such that it includes steps 216–222. At step 216, it is determined for at least one of the service categories supported by the VPA whether or not the bandwidth characteristics of the VPA are more restrictive that the bandwidth limitations of the trunk group. If the bandwidth limitations of the VPA are more restrictive, the method proceeds to step 218 where a table is updated to reflect the bandwidth limitations of the VPA for that particular service category. Thus, if the VPA only allows for a certain amount of CBR traffic that is more restrictive than the level of CBR traffic that the trunk group is able to support, the routing table will reflect bandwidth availability for CBR that corresponds to the VPA rather than the trunk group. If, however, the bandwidth characteristics of the VPA are not more restrictive than those of the trunk group, the method proceeds to step 220 where the routing table is updated to reflect the bandwidth limitations of the trunk group. The trunk group may have partitioning for each service category that may or may not be more restrictive than the VPA for a particular service category, and the routing table is updated to reflect this.

At step 222, once the routing table internal to the source switch, or node, has been updated, the bandwidth limitations for that particular VPA and trunk group are preferably broadcast to at least one additional routing table in the network. More preferably, these limitations are disseminated throughout the network such that routing decisions can be made utilizing this information.

FIG. 3 illustrates a method for establishing a connection over a VPA. The method of FIG. 3 may be used in the network of FIG. I to establish a connection between one of the sources 41–43 and one of the destinations 51–53 via the VPAs 10 between the source switch 30 and the destination switch 60. Preferably, the method of FIG. 3 is included in a CAC algorithm, which is typically used to control connections within the network.

The method of FIG. 3 begins at step 302 where a request for a connection is received. The connection request includes a service category and traffic rate requirements for the connection. For example, a connection request may request a nrt-VBR connection with specified traffic parameters.

At step 304, it is determined whether or not the service category of the request is supported by the trunk group within which the VPA exists. If the trunk group does not support the service category, the connection request is rejected at step 306. If the service category is supported by the trunk group, the method proceeds to step 305.

At step 305, it is determined whether the connection request corresponds to a Virtual Channel Connection (VCC) type. If the connection is a VCC, it can be established within a VPA, and the method proceeds to step 308. However, Virtual Path Connection (VPC) types cannot be established within VPA. Therefore, if the connection request does not correspond to a VCC type the method proceeds to step 314 to attempt to establish the connection external to the VPA.

At step 314, it is known that the trunk group supports the service category, even though the VPA does not, and therefore it is determined whether or not the bandwidth requirement of the connection is within the available bandwidth of the trunk group. If the bandwidth of the connection exceeds the limitations of the trunk group, the connection request is rejected at step 316. If it is determined at step 314 that the bandwidth requirement of the connection is within the available bandwidth of the trunk group, the method proceeds to step 318. At step 318, the VPC is established within the trunk group outside of the VPA. Thus, although the connection may exceed the limitations of the VPA, it is within the limitations of the trunk group, and therefore is established.

At step 308, it is determined whether or not the service category of the connection request is supported by the VPA. If the VPA does not support the service category of the connection request, the method proceeds to step 316, where the connection request is rejected. If the service category is supported by the VPA, the method proceeds to step 310. At step 310, it is determined whether or not the bandwidth requirements of the connection are within the available bandwidth of the VPA. If they are not, the method proceeds to step 316 where the connection request is rejected.

Because VCCs must satisfy both the trunk group and VPA CAC resource allocations, if it is determined at step 310 that the bandwidth requirements of the connection are within the available bandwidth of the VPA, the method proceeds to step 311. At step 311 it is determined whether the bandwidth requirement of the connection is within the available bandwidth of the corresponding trunk group partition. If not, the connection request is rejected at step 316. If the connection bandwidth requirement is within the partition limitations, the method proceeds to step 312 where the connection is established within the VPA.

At step 320, the available bandwidth for at least one of the service categories supported by the trunk group is determined. As before, the bandwidth limitations for the trunk group are preferably determined based on the lesser of the available bandwidth of the VPA for the service category and the available bandwidth of the trunk group for the service category.

At step 322, a routing table is updated to reflect the available bandwidth within the trunk group. As before, the updated table information may be provided to other nodes within the network such that intelligent routing decisions can be made based on the available bandwidth within the both the VPA and the trunk group. The structure of the routing table is preferably such that the bandwidth availability for each of the different service categories supported by the network is included. In an ATM system, this requires indicating the level of bandwidth availability for each of the five different service categories.

The table below illustrates the service categories supported by a VPA that is configured to support a specific service category. As the table below indicates, a VPA that supports a CBR service category is capable of carrying traffic from all five of the potential service categories. Similarly, a rt-VBR VPA supports all service categories except CBR. It should be noted that an ABR VPA is capable of supporting nrt-VBR, ABR, and UBR service categories.

| VCCs supported | VPA | | | | |
|---|---|---|---|---|---|
| by the VPA | CBR | rt-VBR | nrt-VBR | ABR | UBR |
| CBR | X | | | | |
| rt-VBR | X | X | | | |
| nrt-VBR | X | X | X | X | |
| ABR | X | X | X | X | |
| UBR | X | X | X | X | X |

By determining and storing the available bandwidth for different service categories within VPAs in a communication system, routing protocols will be able to use the available resources more efficiently. Thus, paths that will satisfy the resource requirements for a given connection can be located and used to establish the connection more quickly and more efficiently. By including the information concerning VPAs in the routing information, the potential for call blocking and other types of congestion within the network are alleviated. This is because routing decisions are made on a more informed basis. In addition to this, more intelligent routing may allow for additional calls to exist in the network as the resources are used in a more efficient manner than would occur if the VPA information were absent from the routing tables.

The present invention a method and apparatus for supporting the inclusion of VPAs in a data communication system. The method and apparatus can be used in association with any type of routing protocol that is used in association with an ATM network. These routing protocols include private network-to-network interface (PNNI), source routing, and the like. By providing these routing protocols with an improved view of the overall network topology, more efficient use of the network is possible.

It should be understood that the implementation of other variations and modifications of the inventions in its various aspects should be apparent to those of ordinary skill in the art, and that the invention is not limited to the specific embodiments described. It is therefore contemplated to cover by the present invention, any and all modifications, variations, or equivalents that fall within spirit and scope of the basic underlying principles disclosed and claimed herein.

What is claimed is:

1. A method for establishing a virtual path aggregation in a network, the method comprising:
   receiving a request for a virtual path aggregation, wherein the request indicates a desired data path between a source switch and a destination switch, wherein the request includes a traffic descriptor and a virtual path identifier for the virtual path aggregation;
   determining if there is a trunk group within the source switch having a virtual path identifier that matches the virtual path identifier of the virtual path aggregation;
   when the trunk group having a virtual path identifier that matches the virtual path identifier of the virtual path aggregation is present:
      comparing bandwidth characteristics included in the traffic descriptor of the virtual path aggregation with bandwidth limitations of the trunk group;
      when the bandwidth characteristics of the virtual path aggregation compare unfavorably with the bandwidth limitations of the trunk group, rejecting the virtual path aggregation request; and
      when the bandwidth characteristics of the virtual path aggregation compare favorably with the bandwidth limitations of the trunk group, creating the virtual path aggregation such that the virtual path aggregation corresponds to the trunk group.

2. The method of claim 1, wherein when the trunk group having a virtual path identifier that matches the virtual path identifier of the virtual path aggregation is not present:
   comparing the bandwidth characteristics of the virtual path aggregation with bandwidth limitations of a port within the source switch;
   when the bandwidth characteristics of the virtual path aggregation compare favorably with the bandwidth limitations of the port, creating the virtual path aggregation such that the virtual path aggregation corresponds to the port; and
   when the bandwidth characteristics of the virtual path aggregation compare unfavorably with the bandwidth limitations of the port, rejecting the virtual path aggregation request.

3. The method of claim 2, wherein creating the virtual path aggregation such that the virtual path aggregation corresponds to the port further comprises creating the virtual path aggregation such that the virtual path aggregation supports permanent virtual connections.

4. The method of claim 1, wherein creating the virtual path aggregation such that the virtual path aggregation corresponds to the trunk group further comprises:
   for at least one service category within the trunk group, determining if bandwidth limitations of the virtual path aggregation corresponding to the service category are more restrictive than bandwidth limitations of the trunk group corresponding to the service category;
   when the bandwidth limitations of the virtual path aggregation are more restrictive, updating a routing table to reflect the bandwidth limitations of the virtual path aggregation for the service category; and
   when the bandwidth limitations of the trunk group are more restrictive, updating the routing table to reflect the bandwidth limitations of the trunk group for the service category.

5. The method of claim 4, wherein updating the routing table further comprises broadcasting bandwidth limitations to at least one additional routing table in the network.

6. The method of claim 1, wherein creating the virtual path aggregation such that the virtual path aggregation corresponds to the trunk group further comprises creating the virtual path aggregation such that the virtual path aggregation supports virtual channel connections.

7. The method of claim 1, wherein the virtual path aggregation is virtual path connection that supports at least one virtual channel connection, wherein set up and shaping of the virtual path aggregation provides set up and shaping of the at least one virtual channel connection.

8. An apparatus for connection admission control comprising:
   a processor;
   a memory operably coupled to the processor, wherein the memory stores a connection admission control algorithm, wherein when executed by the processor, the connection admission control algorithm causes the processor to:
      determine, in response to a request for a virtual path aggregation, if there is a trunk group, within a source switch, having a virtual path identifier that matches the virtual path identifier of the virtual path aggregation, wherein the request indicates a desired data path between the source switch and a destination switch, wherein the request includes a traffic descriptor and a virtual path identifier for the virtual path aggregation;
      reject the virtual path aggregation request when:
         there is a trunk group within the switch with the same virtual path identifier as the virtual path aggregation; and
         bandwidth characteristics of the virtual path aggregation that are included in the traffic descriptor compare unfavorably with bandwidth limitations of the trunk group; and
      create the virtual path aggregation such that the virtual path aggregation corresponds to the trunk group when:
         there is a trunk group within the switch with the same virtual path identifier as the virtual path aggregation; and
         the bandwidth characteristics of the virtual path aggregation compare favorably with bandwidth limitations of the trunk group.

9. The apparatus of claim 8, wherein the connection admission control algorithm further comprises operating instructions that cause the processor to:
   reject the virtual path aggregation request when:
      there is not a trunk group within the switch that has a virtual path identifier that matches and virtual path identifier of the virtual path aggregation; and
      the bandwidth characteristics of the virtual path aggregation compare unfavorably with bandwidth limitations of a port within the source switch; and create the virtual path aggregation such that the virtual path aggregation corresponds to the port when:
   there is not a trunk group within the switch that has a virtual path identifier that matches and virtual path identifier of the virtual path aggregation; and
   the bandwidth characteristics of the virtual path aggregation compare favorably with bandwidth limitations of the port.

10. The apparatus of claim 8, wherein the connection admission control algorithm further comprises operating instructions that cause the processor to create the virtual path aggregation corresponding to the trunk group such that the virtual path aggregation supports switched connections.

11. The apparatus of claim 8, wherein the connection admission control algorithm further comprises operating instructions such that when the processor creates the virtual path aggregation corresponding to the trunk group, the processor
   determines, for at least one service category within the trunk group, if bandwidth limitations of the virtual path aggregation corresponding to the service category are more restrictive than bandwidth limitations of the trunk group corresponding to the service category;
   updates a routing table to reflect the bandwidth limitations of the virtual path aggregation for the service category when the bandwidth limitations of the virtual path aggregation are more restrictive; and
   updates the routing table to reflect the bandwidth limitations of the trunk group for the service category when the bandwidth limitations of the trunk group are more restrictive.

12. The apparatus of claim 11, wherein the connection admission control algorithm further comprises operating instructions such that when the processor updates the routing table, the processor broadcasts bandwidth limitations in the routing table to at least one additional routing table in the network.

13. The apparatus of claim 8, wherein the connection admission control algorithm further comprises operating instructions such that when the processor creates the virtual path such that it supports at least one virtual channel connection, wherein set up of the virtual path aggregation provides set up of the at least one virtual channel connection.

14. A method for establishing a connection over a virtual path aggregation, comprising:
   receiving a request for a connection, wherein the request includes a service category and a bandwidth requirement for the connection;
   rejecting the request when the service category of the connection is not supported by a trunk group that includes the virtual path aggregation;
   determining if the connection is a virtual channel connection type;
   when the connection is a virtual channel connection type:
      determining if the service category for the connection is supported by the virtual path aggregation;
      when the service category for the connection is supported by the virtual path aggregation:
         determining if the bandwidth requirement for the connection is within available bandwidth of the virtual path aggregation and a partition corresponding to the trunk group;
            when the bandwidth requirement for the connection is within the available bandwidth of the virtual path aggregation and the partition, establishing the connection within the virtual path aggregation; and
            when the bandwidth requirement for the connection is not within the available bandwidth of the virtual path aggregation and the partition, rejecting the connection request.

15. The method of claim 14 further comprises:
   when the connection is a virtual path connection type,
      determining if the bandwidth requirement for the connection is within available bandwidth of the trunk group;
      when the bandwidth requirement for the connection is within the available bandwidth of the trunk group, establishing the connection within the trunk group outside the virtual path aggregation; and
      when the bandwidth requirement for the connection is not within the available bandwidth of the trunk group, rejecting the connection request.

16. The method of claim 15, wherein establishing the connection further comprises:
   determining available bandwidth within the trunk group for at least one service category supported by the trunk group; and
   updating a table to reflect the available bandwidth within the trunk group.

17. The method of claim 16, wherein determining available bandwidth for a service category further comprises determining which is lesser between available bandwidth of the virtual path aggregation for the service category and available bandwidth of the trunk group for the service category.

18. An apparatus for connection admission control that controls connections using a virtual path aggregation within a trunk group, comprising:
   a processor;
   a memory operably coupled to the processor, wherein the memory stores a connection admission control algorithm, wherein when executed by the processor, the connection admission control algorithm causes the processor, in response to a request for a connection that includes a service category and a bandwidth requirement of the connection, to:
   reject the request when the service category of the connection is not supported by the trunk group;
   determine if the connection is a virtual channel connection type;
   when the connection is a virtual channel connection type:
      determine if the virtual path aggregation supports the service category for the connection;
      when the virtual path aggregation supports the service category:
         determine if the bandwidth requirement for the connection is within available bandwidth of the virtual path aggregation and a partition of the trunk group;
         when the bandwidth requirement for the connection is within the available bandwidth of the virtual path aggregation and the partition, establish the connection within the virtual path aggregation; and
         when the bandwidth requirement for the connection is not within the available bandwidth of the virtual path aggregation and the partition, reject the connection.

19. The apparatus of claim 18, wherein the connection admission control algorithm further comprises operating instructions that cause the processor to:

when the connection is a virtual path connection type:
   determine if the bandwidth requirement for the connection is within available bandwidth of the trunk group;
      when the bandwidth requirement for the connection is within the available bandwidth of the trunk group, establish the connection within the trunk group outside the virtual path aggregation; and
      when the bandwidth requirement for the connection is not within the available bandwidth of the trunk group, reject the connection request.

20. The apparatus of claim 19, wherein the connection admission control algorithm further comprises operating instructions such that when the processor establishes the connection the processor:
   determines available bandwidth within the trunk group for at least one service category supported by the trunk group; and
   updates a table to reflect the available bandwidth within the trunk group.

21. The apparatus of claim 20, wherein the connection admission control algorithm further comprises operating instructions such that the processor determines available bandwidth within the trunk group for the service category by determining which is lesser between available bandwidth of the virtual path aggregation for the service category and available bandwidth of the trunk group for the service category.

22. A method for establishing a virtual path aggregation in a network, the method comprising:
   receiving a request for a virtual path aggregation, wherein the request indicates a desired data path between a source switch and a destination switch, wherein the request includes a traffic descriptor;
   determining if there is a trunk group within the source switch suitable for the virtual path aggregation;
   when the trunk group suitable for virtual path aggregation is present;
   comparing bandwidth characteristics included in the traffic descriptor of the virtual path aggregation with bandwidth limitations of the trunk group;
      when the bandwidth characteristics of the virtual path aggregation compare unfavorably with the bandwidth limitations of the trunk group, rejecting the virtual path aggregation request; and
      when the bandwidth characteristics of the virtual path aggregation compare favorably with the bandwidth limitations of the trunk group, creating the virtual path aggregation such that the virtual path aggregation corresponds to the trunk group.

23. The method of claim 22, wherein when the trunk group suitable for the virtual path aggregation is not present:
   comparing the bandwidth characteristics of the virtual path aggregation with the bandwidth limitations of a port within the source switch;
      when the bandwidth characteristics of the virtual path aggregation compare favorably with the bandwidth limitations of the port, creating the virtual path aggregation such that the virtual path aggregation corresponds to the port; and
      when the bandwidth characteristics of the virtual path aggregation compare unfavorably with the bandwidth limitations of the port, rejecting the virtual path aggregation request.

24. The method of claim 23, wherein creating the virtual path aggregation such that the virtual path aggregation corresponds to the port further comprises creating the virtual path aggregation such that the virtual path aggregation supports permanent virtual connections.

25. The method of claim 22, wherein creating the virtual path aggregation such that the virtual path aggregation corresponds to the trunk group further comprises:
   for at least one service category within the trunk group, determining if bandwidth limitations of the virtual path aggregation corresponding to the service category are more restrictive than bandwidth limitations of the trunk group corresponding to the service category;
   when the bandwidth limitations of the virtual path aggregation are more restrictive, updating a routing table to reflect the bandwidth limitations of the virtual path aggregation for the service category; and
   when the bandwidth limitations of the trunk group are more restrictive, updating the routing table to reflect the bandwidth limitations of the trunk group for the service category.

26. The method of claim 25, wherein updating the routing table further comprises broadcasting bandwidth limitations to at least one additional routing table in the network.

27. The method of claim 22, wherein creating the virtual path aggregation such that the virtual path aggregation corresponds to the trunk group further comprises creating the virtual path aggregation such that the virtual path aggregation supports virtual channel connections.

28. The method of claim 22, wherein the virtual path aggregation is virtual path connection that supports at least one virtual channel connection, wherein set up and shaping of the virtual path aggregation provides set up and shaping of the at least one virtual channel connection.

29. An apparatus for connection admission control comprising:
   a processor;
   a memory operably coupled to the processor, wherein the memory stores a connection admission control algorithm, wherein when executed by the processor, the connection admission control algorithm causes the processor to:
      determine, in response to a request for a virtual path aggregation, if there is a trunk group, within a source switch, suitable for the virtual path aggregation, wherein the request indicates a desired data path between the source switch and a destination switch, wherein the request includes a traffic descriptor;
      reject the virtual path aggregation request when:
         there is a trunk group within the switch suitable for the virtual path aggregation; and
         bandwidth characteristics of the virtual path aggregation that are included in the traffic descriptor compare unfavorably with bandwidth limitations of the trunk group; and
      create the virtual path aggregation such that the virtual path aggregation corresponds to the trunk group when:
         there is a trunk group within the switch suitable for the virtual path aggregation; and
         the bandwidth characteristics of the virtual path aggregation compare favorably with bandwidth limitations of the trunk group.

30. The apparatus of claim 29, wherein the connection admission control algorithm further comprises operating instructions that cause the processor to:
   reject the virtual path aggregation request when:
      there is not a trunk group within the switch suitable for the virtual path aggregation; and the bandwidth characteristics of the virtual path aggregation compare unfavorably with bandwidth limitations of a port within the source switch; and create the virtual path aggregation such that the virtual path aggregation corresponds to the port when:

there is not a trunk group within the switch suitable for the virtual path aggregation; and the bandwidth characteristics of the virtual path aggregation compare favorably with bandwidth limitations of the port.

31. The apparatus of claim 29, wherein the connection admission control algorithm further comprises operating instructions that cause the processor to create the virtual path aggregation corresponding to the trunk group such that the virtual path aggregation supports switched connections.

32. The apparatus of claim 29, wherein the connection admission control algorithm further comprises operating instructions such that when the processor creates the virtual path aggregation corresponding to the trunk group, the processor
    determines, for at least one service category within the trunk group, if bandwidth limitations of the virtual path aggregation corresponding to the service category are more restrictive than bandwidth limitations of the trunk group corresponding to the service category;

updates a routing table to reflect the bandwith limitations of the virtual path aggregation for the service category when the bandwidth limitations of the virtual path aggregation are more restrictive; and updates the routing table to reflect the bandwidth limitations of the trunk group for the service category when the bandwidth limitations of the trunk group are more restrictive.

33. The apparatus of claim 32, wherein the connection admission control algorithm further comprises operating instructions such that when the processor updates the routing table, the processor broadcasts bandwidth limitations in the routing table to at least one additional routing table in the network.

34. The apparatus of claim 29, wherein the connection admission control algorithm further comprises operating instructions such that when the processor creates the virtual path such that it supports at least one virtual channel, wherein set up of the virtual path aggregation provides set up of the at least one virtual channel connection.

* * * * *